(12) United States Patent
Wade

(10) Patent No.: US 7,225,453 B2
(45) Date of Patent: May 29, 2007

(54) OPTICAL HEAD DEVICE FOR ABSORBING VIBRATIONS IN AN OBJECTIVE LENS

(75) Inventor: Tatsuki Wade, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 376 days.

(21) Appl. No.: 10/676,861

(22) Filed: Sep. 30, 2003

(65) Prior Publication Data

US 2004/0128679 A1    Jul. 1, 2004

(30) Foreign Application Priority Data

Oct. 2, 2002    (JP) .............................. 2002-289477

(51) Int. Cl.
*G11B 7/09* (2006.01)
(52) U.S. Cl. .................................... 720/684
(58) Field of Classification Search ................. 720/684
See application file for complete search history.

(56) References Cited

U.S. PATENT DOCUMENTS

2002/0141323 A1*    10/2002    Horita et al. .......... 369/112.23

FOREIGN PATENT DOCUMENTS

| JP | 3-144924 A | * | 6/1991 |
| JP | 10-079128 A | * | 3/1998 |
| JP | 2000-348358 A | * | 12/2000 |
| JP | 2005-216357 A | * | 8/2005 |

* cited by examiner

Primary Examiner—Julie Anne Watko
(74) Attorney, Agent, or Firm—Reed Smith LLP

(57) ABSTRACT

An optical head device comprises a lens holder in which an objective lens and drive coils are mounted and a plurality of elastic support members which support the lens holder to move in a focusing direction and a tracking direction. The lens holder has a coil holding portion for holding the drive coils and a lens holding portion which projects from the coil holding portion to the front to hold the objective lens. The lens holding portion is formed thinner than the coil holding portion to avoid interference with a deflecting element positioned beneath the lens holding portion. The lens holding portion has a flat surface with an arc shape from the side portion to the front along the outer circumference of the objective lens. The lens holding portion also has a first vibration-absorbing member attached to the front end portion thereof.

3 Claims, 6 Drawing Sheets

OPTICAL HEAD DEVICE FOR ABSORBING VIBRATIONS IN AN OBJECTIVE LENS

CROSS-REFERENCE TO RELATED APPLICATIONS

This application claims priority of Japanese application Serial No. 2002-289477, filed Oct. 2, 2002.

BACKGROUND OF THE INVENTION a) Field of the Invention

The present invention relates to an optical head device which is used for recording on and reproducing from optical recording media. More specifically, it relates to a vibration-proof technology for an objective lens in the optical head device.

b) Description of the Related Art

As illustrated in FIGS. 5(A) and (B), an optical head device used for the recording and reproducing of optical recording media such as CDs, CD-Rs, and DVDs has a lens holder 3 that holds an objective lens 2, four wires 4 that support the lens holder 3, a drive coil 5 and a drive coil 6 that are fixed to the lens holder 3 for focusing and tracking respectively, and drive magnets 7 and 8 that generate magnetic flux linked to the drive coils 5 and 6. A drive circuit (not illustrated) is arranged on the side of a fixing member (not illustrated), to which the wires 4 are fixed, so that the electricity is supplied to the drive coils 5 and 6 through the wires 4 as the electricity supply lines.

In a popular conventional technology, the objective lens 2 is positioned in the center of the lens holder 3. However, the lens holder 3 in the optical head device illustrated in FIGS. 5(A) and (B) has a coil holding portion 31 that holds the drive coils 5 and 6 and a lens holding portion 35 that projects from the coil holding portion 31 to the front to hold the objective lens 2 on its the top surface.

In the optical head device having such a configuration, once the drive coils 5 and 6 are electrified and a Lorentz force is generated, the lens holder 3 holding the objective lens 2 can be driven in the focusing direction and the tracking direction by a Lorentz force. If the objective lens 2 is vibrated at that time, the recording or reproduction of the optical recording medium cannot be performed accurately. When the objective lens 2 is positioned in the center of the lens holder 3, the center of gravity of the lens holder 3 overlies the center of the objective lens 2. Therefore, sympathetic vibrations seldom occur. Even when sympathetic vibrations are caused, the recording and reproduction of recording media are not affected very much. On the other hand, in the optical head device illustrated in FIGS. 5(A) and (B) having the configuration in which the lens holding portion 35 projects from the coil holding portion 31, sympathetic vibrations are easily caused; since the lens holding portion 35 is lighter than the coil holding portion 31, the objective lens 2 is easily affected by sympathetic vibrations.

Recently used is the technology in which the lens holding portion 35 is made thick to increase rigidity so that the influence of sympathetic vibrations is prevented. However, the current demand for thinner optical head devices brings a demand for a thinner lens holding portion 35, as illustrated in FIGS. 5(A) and (B).

In order to prevent the influence of sympathetic vibrations even when the portion 31 is made thin, the lens holding portion 35 is provided with a wide portion 351 having a width equal to the width of the coil holding portion 31, and a flat surface is so shaped from the wide portion 351 to the front portion 352 that it largely surrounds the objective lens 2 to form a wide area around the objective lens 2. In this manner, the rigidity of the lens holding portion 35 is increased.

Problems Addressed by the Invention

However, when the lens holding portion 35 is made thin and the area of the lens holding portion 35 is made wide, large vibrations resembling vibrations caused on a trampoline become noticeable in the flat surface in the lens holding portion 35.

Also, the present patent applicant has provided a rib 36 to the side portion of the lens holding portion 35, as illustrated in FIGS. 6(A) and (B), to increase rigidity of the root portion of the lens holding portion 35 when the lens holding portion 35 is made thin.

However, if the rib 36 is provided while the lens holding portion 35 is made thin, torsional vibrations are generated on the lens holding portion 35.

SUMMARY OF THE INVENTION

Considering the above problems, the primary object of the present invention is to provide an optical head device that can effectively prevent vibrations of an objective lens even when a lens holding portion is made thin.

To solve the above problems, the first form of the present invention comprises a lens holder in which an objective lens and drive coils are mounted, and a plurality of elastic support members which support the lens holder to move in a focusing direction and a tracking direction; wherein the lens holder has a coil holding portion for holding the drive coils and a lens holding portion which projects from the coil holding portion to the front to hold the objective lens; the lens holding portion is formed thinner than the coil holding portion to avoid the interference with a deflecting element positioned beneath the lens holding portion, has a flat surface with an arc shape from the side portion to the front portion along the outer circumference of the objective lens, and has a first vibration-absorbing member attached to the front end portion of the lens If the lens holding portion is made thin but with a wide area to increase rigidity, a large vibration is caused in the flat surface of the lens holding portion. Therefore, in the first form of the present invention, the lens holding portion is formed with a flat surface having an arc shape from the side portion to the front portion along the outer circumference of the objective lens to prevent vibrations in the flat surface of the lens holding portion. Since such a configuration by itself cannot prevent cantilever vibrations in the focusing direction at the root portion of the lens holding portion, the first vibration-absorbing member is provided on the front end of the lens holding portion to eliminate such cantilever vibrations. In other words, in the present invention the lens holding portion is made in a ring-like shape to gather the vibrations in the focusing direction at the front end of the lens holding portion so that the vibrations are eliminated by the first vibration-absorbing member. Accordingly, even when the lens holding portion is made thin, sympathetic vibrations in the objective lens can be eliminated effectively.

The second form of the present invention comprises a lens holder in which an objective lens and drive coils are mounted, a plurality of elastic support members which support the lens holder to move in a focusing direction and a tracking direction; wherein the lens holder has a coil holding portion for holding the drive coils and a lens holding portion which projects from the coil holding portion to the front to hold the objective lens; the lens holding portion is formed thinner than the coil holding portion to avoid interference with a deflecting element positioned beneath the lens holding portion; and at least one second vibration-absorbing member is provided at the border between the coil holding portion and the lens holding portion.

Torsional vibrations become more prominent when the lens holding portion is made thin and a rib is used to enhance rigidity at the root portion thereof of the lens holding portion. For this reason, in the second form of the present invention, a rib is not used at the root portion of the lens holding portion, and the vibrations in the tracking direction, which would become noticeable because of the missing rib, are eliminated by the second vibration-absorbing member. In other words, in the present invention, since a rib is not provided in the lens holder, the vibrations in the tracking direction are gathered at the root portion of the lens holding portion and eliminated by the second vibration-absorbing member. Accordingly, even when the lens holding portion is made thin, sympathetic vibrations of the objective lens can be eliminated effectively.

In the present invention, the first and second forms can be combined. In other words, in the second form of the present invention, the lens holding portion has a flat surface with an arc shape from the side portion to the front portion along the outer circumference of the objective lens, and the first vibration-absorbing member may be provided to the front end of the lens holding portion.

DESCRIPTION OF THE PREFERRED EMBODIMENTS

Figure 1:
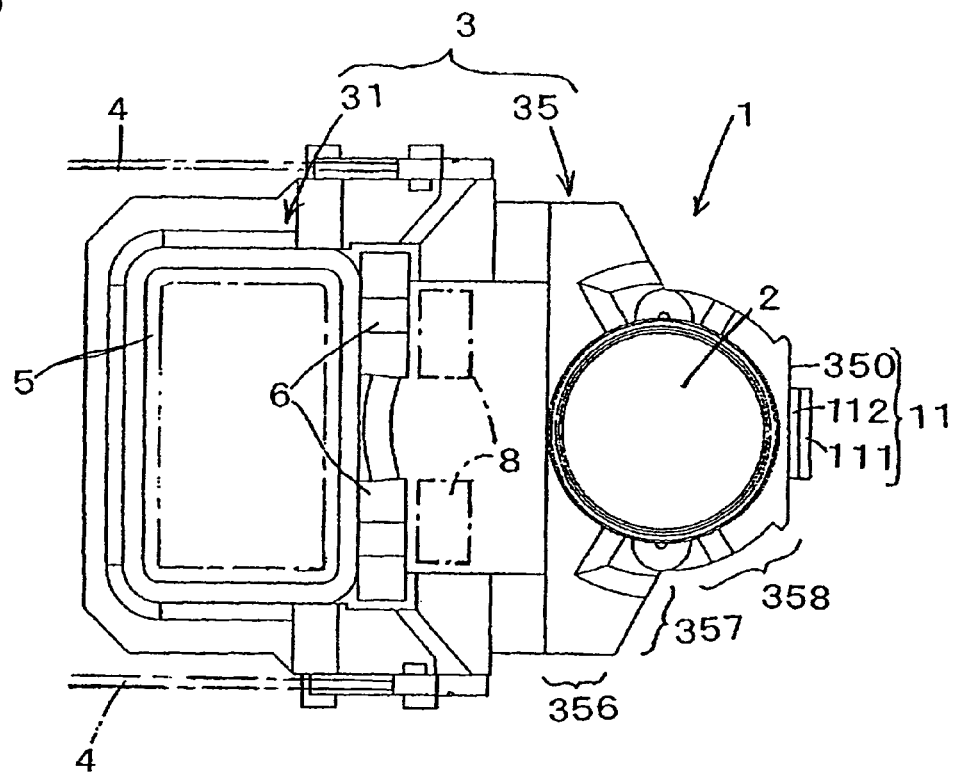
FIGS. 1(A) and (B) are a plan view and a perspective diagram respectively, of a major configuration of an optical head device of Embodiment 1 of the present invention.
Figure 1:
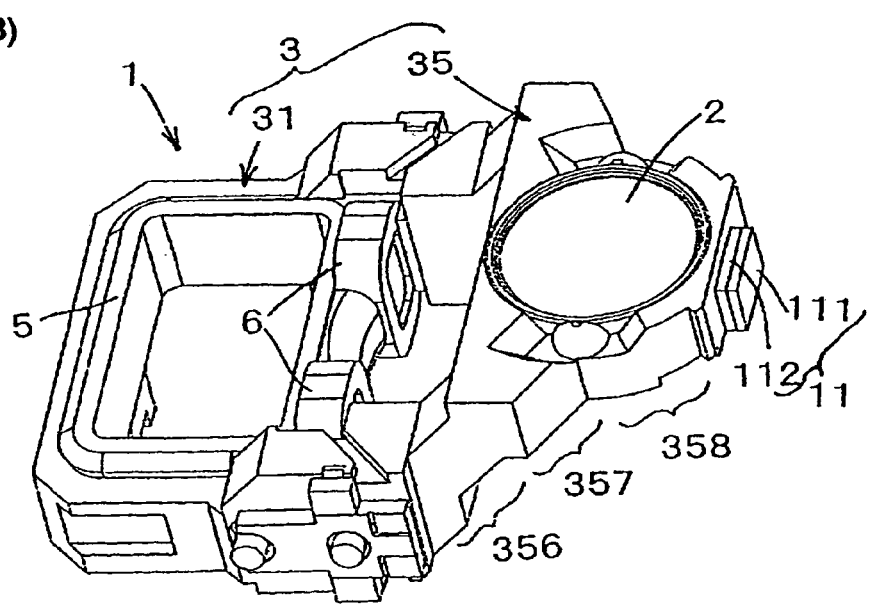

Embodiments of the present invention are described hereinafter, referring to the drawings. Note that the embodiments that are described hereinafter share the basic configuration of the conventional one. Therefore, the common members are given the same code numbers.

Embodiment 1

FIGS. 1(A) and (B) are respectively a plan view and a perspective diagram of the configuration of a major portion of an optical head device of Embodiment 1 of the present invention. FIGS. 2(A) and (B) are respectively a perspective diagram of a cut-out of the major portion of the optical head device of FIG. 1 and its vertical cross-sectional view. Note that wires and drive magnets are not illustrated in FIG. 1(B).

Figure 2:
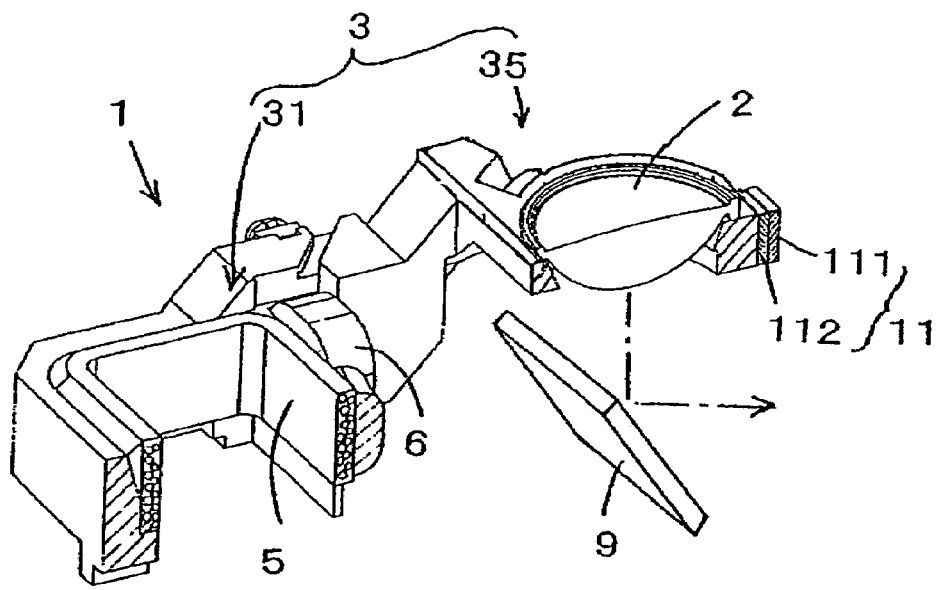
FIGS. 2(A) and (B) are a perspective diagram and a vertical cross-sectional view respectively, of a partially-cut major portion of the optical head device of FIG. 1.
Figure 2:
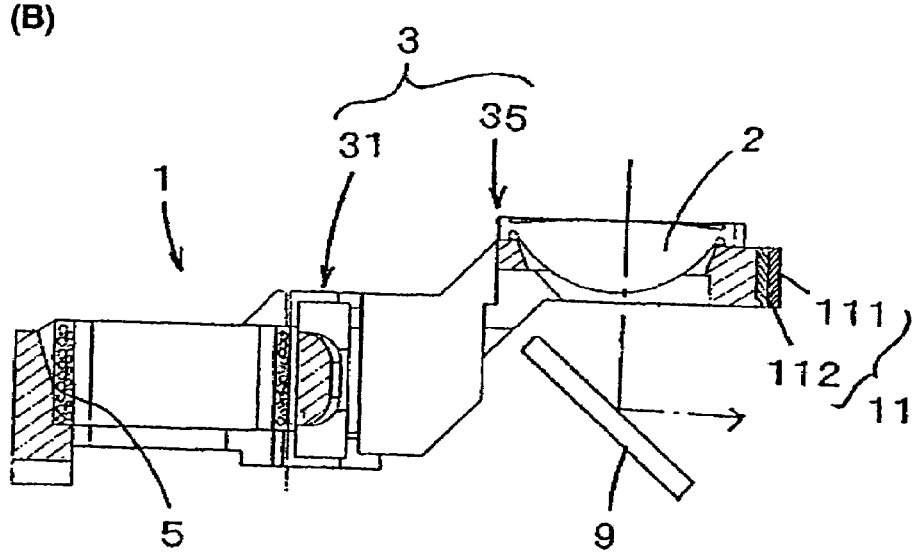

FIGS. 1 and 2 show an optical head device 1 of this embodiment, which is used for the recording and reproducing of optical recording media such as CDs, CD-Rs, and DVDs. The optical head device 1 comprises a lens holder 3 for holding an objective lens 2, a fixing member (not illustrated) for supporting the lens holder 3 through four wires 4, a focusing drive coil 5 and a tracking drive coil 6, both of which are fixed to the lens holder 3, and drive magnets 7 and 8 that generate magnetic flux linked to the drive coils 5 and 6. A drive circuit (not illustrated) for the drive coils 5 and 6 is arranged on the side of the fixing member so that the electricity is supplied to the drive coils 5 and 6 through the wires 4 as electricity supply lines.

The lens holder 3 has a coil holding portion 31 for holding the drive coils 5 and 6 and a lens holding portion 35 which projects from the coil holding portion 31 toward the front to hold the objective lens 2 on its top surface.

In the optical head device 1 of this embodiment, the lens holding portion 35 is formed much thinner than the coil holding portion 31 to avoid interference with a deflecting element 9 such as a total reflection mirror, which is positioned diagonally beneath the lens holding portion 35. Thus, the lens holding portion 35 is made light.

However, when the lens holding portion 35 is made thin, the rigidity thereof is decreased; also it becomes light. Consequently, sympathetic vibrations are easily generated at the lens holding portion 35. In this embodiment, the lens holding portion 35 is formed in a ring-like shape, instead of with a large area to increase its rigidity.

In other words, the lens holding portion 35 is formed as a flat surface such that it includes a wide portion 356 that extends at an equal width from the coil holding portion 31, a side portion 357 which inclines inwardly and widely from the border with the wide portion 356, and a front portion 358 which is shaped in an arc from the border with the side portion 357 along the outer circumference of the objective lens 2.

In this embodiment, a flat portion 350 is formed at the front end of the lens holding portion 35 so that the first vibration-absorbing member 11 can be attached thereto. The vibration-absorbing member 11 is a damper, in which a metallic weight member 111 is fixed by an elastic adhesive or a thermal curing-type adhesive to the lens holder 3 via an elastic member 112 such as rubber.

In the optical head device 1 having such a configuration, when the drive coils 5 and 6 are electrified and a Lorentz force is generated, the lens holder 3 holding the objective lens 2 can be driven in the focusing direction and the tracking direction by a Lorentz force.

In the lens holder 3, the lens holding portion 35, projecting from the coil holding portion 31, is made thin. Therefore, the lens holding portion 35 is light in weight and therefore poor in rigidity. However, in this embodiment, the lens holding portion 35 is formed as a flat surface such that the portion from the side portion to the front is formed in an arc shape along the outer circumference of the objective lens 2 to eliminate vibrations inside the flat surface of the lens holding portion 35. With such a configuration, cantilever vibrations in the focusing direction may still be caused at the root portion of the lens holding portion. For this reason, the first vibration-absorbing member 11 is provided to the front end of the lens holding portion 35 to eliminate such cantilever vibrations. In other words, in this embodiment, the lens holding portion 35 is formed in a ring-like shape so that the vibrations in the focusing direction are gathered at the front end of the lens holding portion 35 and eliminated by the first vibration-absorbing member 11. Accordingly, even when the lens holding portion is made thin, sympathetic vibrations of the objective lens 2 can be eliminated effectively.

Also, since the lens holding portion 35 is made thin, the lens holder 3 can be light. Further, even when the deflecting element 9 is arranged under the objective lens 2 to be close to the lens 2, the deflecting element 9 and the lens holder 3 do not interfere with one another. Thus, the entire optical head device 1 can be manufactured light and thin.

Embodiment 2

Figure 3:
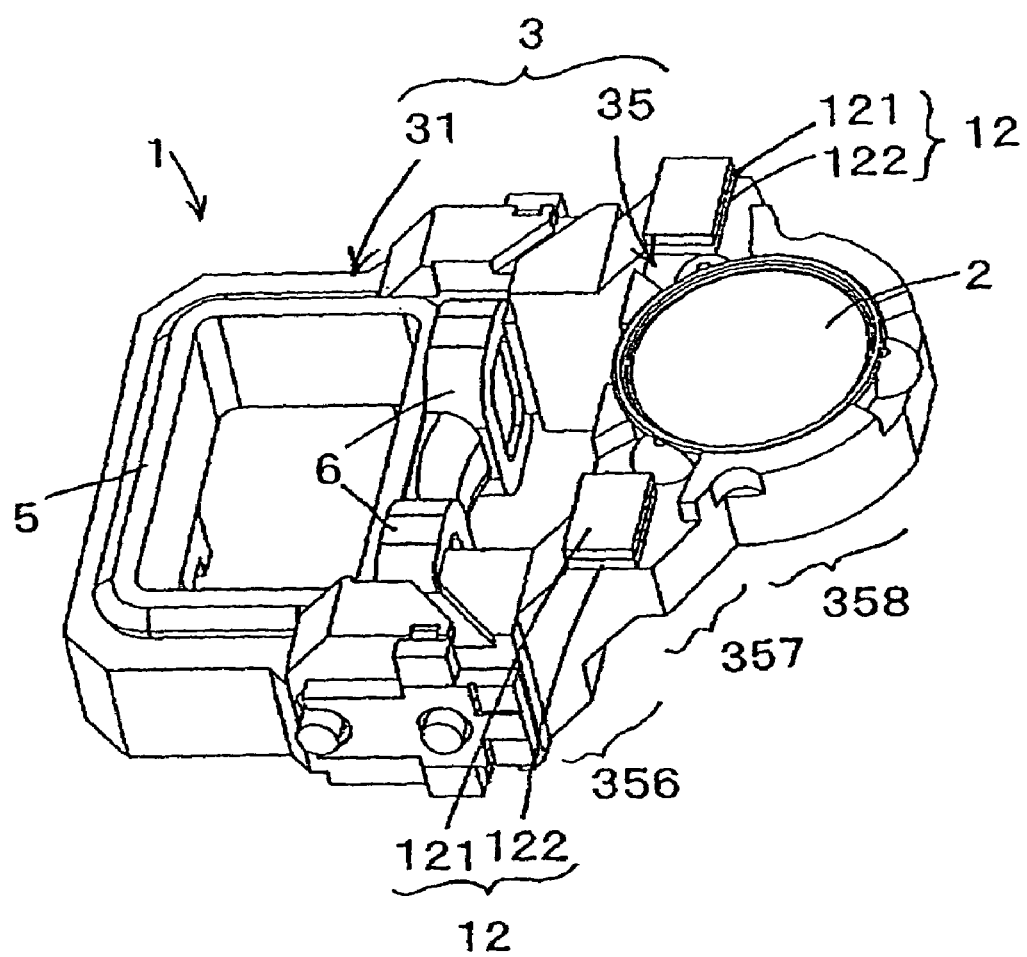
FIG. 3 is a perspective diagram of a major configuration of an optical head device of Embodiment 2 of the present invention.

FIG. 3 is a perspective diagram of a major portion of an optical head device of Embodiment 2 of the present invention. Note that the basic configuration of this embodiment is the same as that of Embodiment 1 and the members sharing the common functions are given the same code numbers and their descriptions are omitted. In FIG. 3, the wires and the drive magnets are not illustrated.

FIG. 3 illustrates an optical head device 1 of this embodiment, which has a lens holder 3, a coil holding portion 31 for holding drive coils 5 and 6, and a lens holding portion 35 that projects from the coil holding portion 31 toward the front to hold an objective lens 2 on the top surface thereof, in the same manner as Embodiment 1.

In the same manner as that of Embodiment 1, the lens holding portion 35 is formed as a flat surface such that it includes a wide portion 356 that extends at an equal width from the coil holding portion 31, a side portion 357 which inclines inwardly and widely from the border with the wide portion 356, and a front portion 358 which is shaped in an arc from the border with the side portion 357 along the outer circumference of the objective lens 2. Thus, the lens holding portion 35 has a ring-like shape on the whole.

In the optical head device 1 of this embodiment, the lens holding portion 35 is formed much thinner than the coil holding portion 31 to avoid interference with the deflecting element such as a total reflection mirror (see FIGS. 2(A) and (B)) positioned diagonally beneath the lens holding portion 35. Thus, the lens holding portion 35 is made light.

As described above, because the lens holding portion 35 in this embodiment is made thin, the lens holder 3 is poor in rigidity and the lens holding portion 35 is lighter than the coil holding portion 31. However, this embodiment does not use the method of providing a rib to the lens holding portion as described in FIGS. 6(A) and (B), but a second vibration-absorbing member 12 is provided on each side of the top surface of the border between the coil holding portion 31 and the lens holding portion 35, i.e., the top surface of the root portion of the lens holding portion 35. The vibration-absorbing member 12 is a damper in which a metallic weight 121 is fixed to the lens holder 3 via an elastic member such as rubber by an elastic adhesive or a thermal-curing-type adhesive.

Even in the optical head device 1 having such a configuration, when the drive coils 5 and 6 are electrified and a Lorentz force is generated, the lens holder 3 holding the objective lens 2 can be driven in the focusing direction and the tracking direction by a Lorentz force.

If a rib is provided to the root portion of the lens holding portion 35 to enhance rigidity, torsional vibrations become more noticeable. For this reason, in this embodiment, a rib is not used at the root portion of the lens holding portion, but the second vibration-absorbing member 12 is provided to eliminate the vibrations in the tracking direction, which would become noticeable because of the missing rib. In other words, in this embodiment, a rib is removed from the lens holder, and the vibrations in the tracking direction are gathered at the root portion of the lens holding portion 35 and eliminated by the second vibration-absorbing member. Accordingly, even when the lens holding portion 35 is made thin, sympathetic vibrations of the objective lens can be eliminated effectively.

Since the lens holding portion 35 in this embodiment is also made thin, the lens holder 3 can be made light; even when the deflecting element is positioned close to the objective lens 2, the deflecting element and the lens holder 3 do not interfere with one another. Therefore, the entire optical head device 1 can be made light and thin.

Embodiment 3

Figure 4:
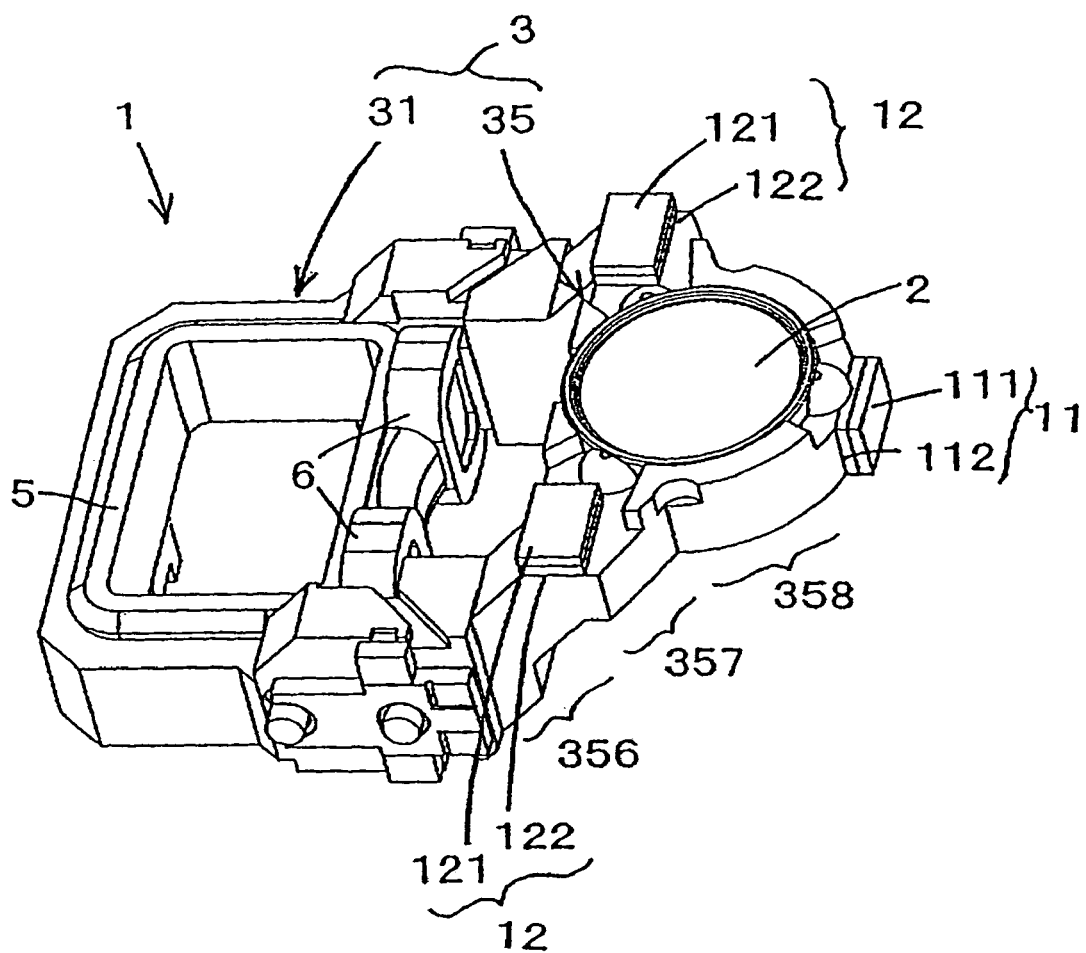
FIG. 4 is a perspective diagram of a major configuration of an optical head device of Embodiment 3 of the present invention.
Figure 5:
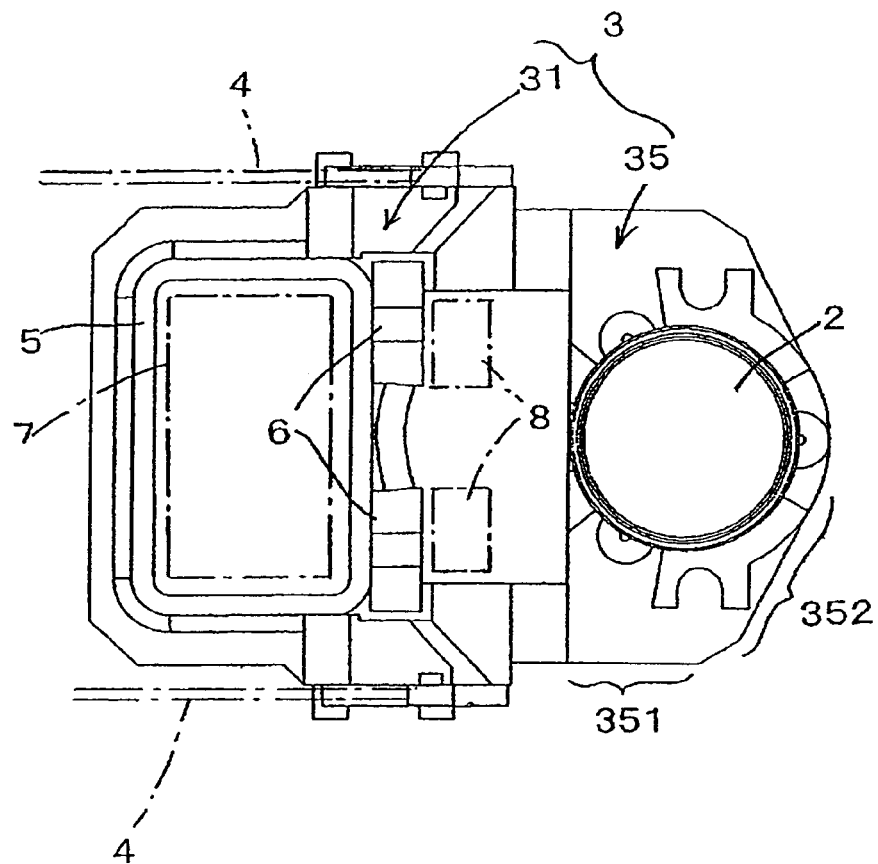
FIGS. 5(A) and (B) are a plan view and a perspective diagram respectively, of a major configuration of a conventional optical head device.
Figure 5:
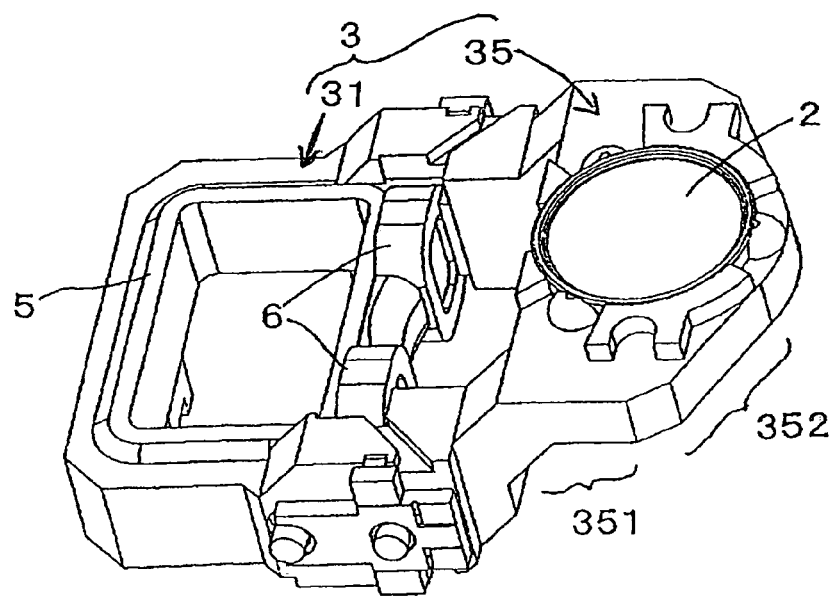

FIG. 4 illustrates a perspective diagram showing a major portion of an optical head device of Embodiment 3 of the present invention. Note that the basic configuration of this embodiment is the same as Embodiments 1 and 2 and the members sharing the common functions are given the same code numbers and their descriptions are omitted. In FIG. 4, the illustration of the wires and the drive magnets is omitted.

FIG. 4 illustrates an optical head device 1 of this embodiment, which has a lens holder 3, a coil holding portion 31 for holding drive coils 5 and 6, and a lens holding portion 35 that projects from the coil holding portion 31 to the front to hold an objective lens 2 on the top surface thereof, in the same manner as Embodiments 1 and 2.

Figure 6:
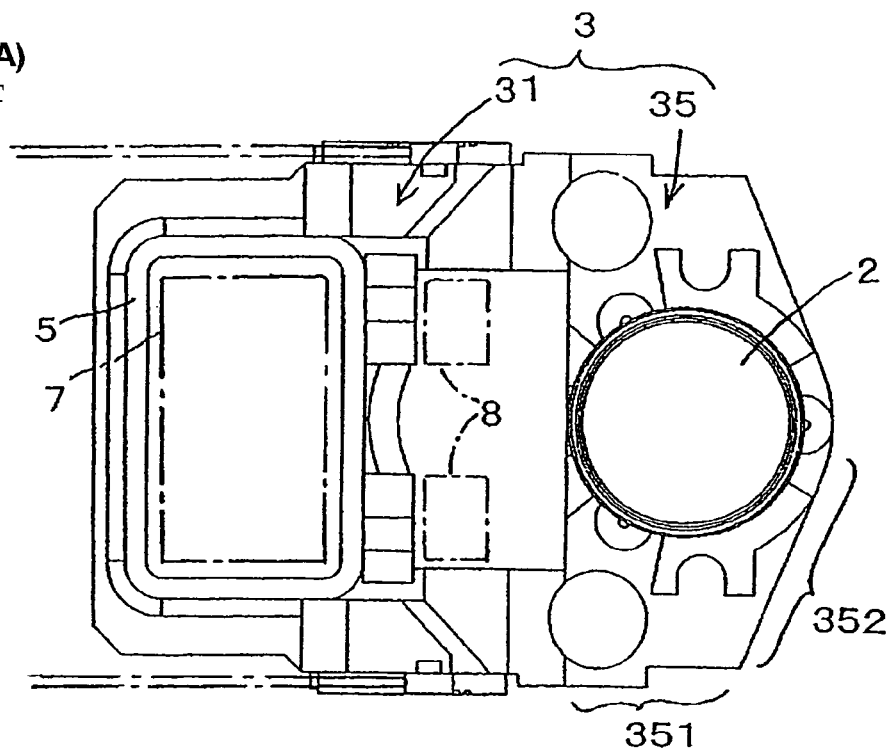
FIGS. 6(A) and (B) are a plan view and a perspective diagram respectively, of a major configuration of another conventional optical head device.
Figure 6:
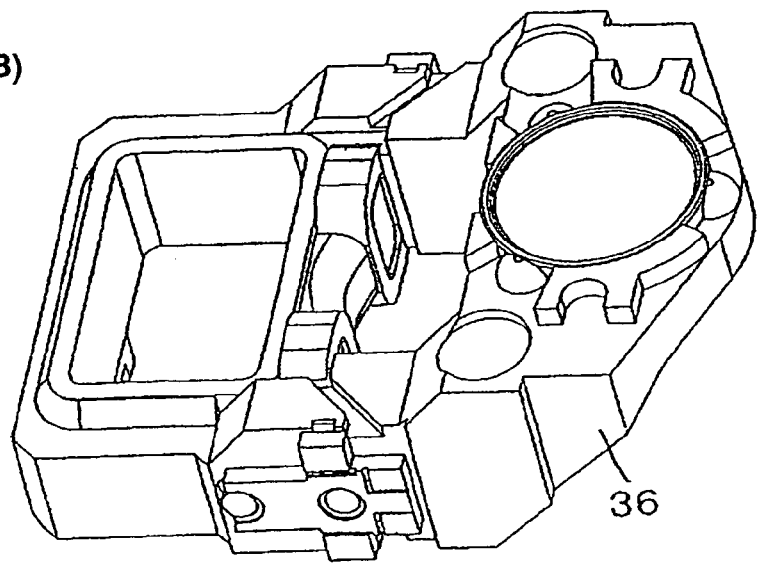

In the same manner as that of Embodiments 1 and 2, the lens holding portion 35 is formed as a flat surface such that it includes a wide portion 356 that extends at an equal width from the coil holding portion 31, a side portion 357 which inclines inwardly and widely from the border with the wide portion 356, and a front portion 358 which is shaped in an arc along the outer circumference of the objective lens 2 from the border with the side portion 357. Thus, the lens holding portion 35 is in a ring-like shape on the whole. A rib as illustrated in FIGS. 6(A) and (B) is not provided to the lens holding portion 35 in this embodiment.

Instead, a flat portion 350 is formed at the front end of the lens holding portion 35 in the same manner as Embodiment 1. The first vibration-absorbing member 11 is attached to the flat portion 350 to eliminate cantilever vibrations in the focusing direction, which are caused at the root portion of the lens holding portion 35. In other words, the lens holding portion is made in a ring-like shape so that the vibrations in the focusing direction are gathered at the front end portion of the lens holding portion 35 and eliminated by the first vibration-absorbing member 11.

In the same manner as Embodiment 2, the second vibration-absorbing member 12 is attached to each side of the top surface of the root portion of the lens holding portion 35. Therefore, in this embodiment, vibrations in the tracking direction, which become noticeable due to the missing rib, are eliminated by the second vibration-absorbing member 12. In other words, in this embodiment, the rib is removed from the lens holding portion 35, and the vibrations in the tracking direction are gathered at the root portion of the lens holding portion 35 and eliminated by the second vibration-absorbing member 12. Accordingly, even when the lens holding portion 35 is made thin, sympathetic vibrations of the objective lens 2 can be eliminated effectively.

Other Embodiments

Note that, although the vibration-absorbing members 11 and 12 are dampers in which a metallic weight is fixed to the lens holder 3 via an elastic member by an adhesive in the above embodiments, an adhesive tape may be used instead.

The number of the vibration-absorbing members 11 and 12 that are to be attached to the lens holder 3 is not limited to one or two, but also can be more.

EFFECTS OF THE INVENTION

As described above, in the present invention, the lens holding portion is formed in a ring-like shape so that the vibrations in the focusing direction can be gathered at the front end of the lens holding portion and eliminated by the first vibration-absorbing member. Therefore, according to the present invention, even when the lens holding portion is made thin, sympathetic vibrations of the objective lens can be eliminated effectively.

Also, the rib is removed from the lens holding portion, and the vibrations in the tracking direction are gathered at the root portion of the lens holding portion and eliminated by the second vibration-absorbing member. Therefore, according to the present invention, even when the lens holding portion is made thin, sympathetic vibrations of the objective lens can be eliminated effectively.

While the foregoing description and drawings represent the present invention, it will be obvious to those skilled in the art that various changes may be made therein without departing from the true spirit and scope of the present invention.

What is claimed is:

1. An optical head device comprising:
a lens holder in which an objective lens and drive coils are mounted;
a plurality of elastic support members which support said lens holder to move in a focusing direction and a tracking direction;
said lens holder having a coil holding portion for holding said drive coils and a lens holding portion which projects from said coil holding portion to the front to hold said objective lens; and
said lens holding portion being formed thinner than said coil holding portion to avoid interference with a deflecting element positioned beneath said lens holding portion, having a flat surface with an arc shape from the side portion to the front along the outer circumference of said objective lens so as to gather vibrations in the focusing direction at a front end portion of the lens holding portion, and having first vibration-absorbing member attached to the front end portion thereof such that an attaching face of the first vibration absorbing member is formed in the focusing direction so as to absorb the vibrations in the focusing direction
wherein the lens holding portion is formed as a flat surface and includes a wide portion that extends at an equal width from the coil holding portion, and a side portion which inclines inwardly and widely from the border with the wide portion, and a front portion which is shaped to border with the side portion along the outer circumstance of the objective lens.

2. An optical head device comprising:
a lens holder in which an objective lens and drive coils are mounted;
a plurality of elastic support members which support said lens holder to move in a focusing direction and a tracking direction;
said lens holder having a coil holding portion for holding said drive coils and a lens holding portion which projects from said coil holding portion to the front to hold said objective lens;
said lens holding portion being formed thinner than said coil holding portion to avoid interference with a deflecting element positioned beneath said lens holding portion and to gather vibrations in the tracking direction at a border between said coil holding portion and said lens holding portion; and
at least one second vibration-absorbing member being provided at the border between said coil holding portion and said lens holding portion such that an attaching face of the second vibration absorbing member is formed in the tracking direction so as to absorb the vibrations in the tracking direction,
wherein the lens holding portion is formed as a flat surface and includes a wide portion that extends at an equal width from the coil holding portion, and a side portion which inclines inwardly and widely from the border with the wide portion, and a front portion which is shaped to border with the side portion along the outer circumstance of the objective lens.

3. The optical head device as set forth in claim 2, wherein said lens holding portion has a flat surface with an arc shape from the side portion to the front along the outer circumference of said objective lens, and has a first shock-absorbing member attached to the front end portion thereof.

* * * * *